No. 847,590. PATENTED MAR. 19, 1907.
S. R. J. & A. V. T. MAYNARD & F. GALE.
ROCK DRILLING MACHINE CHUCK.
APPLICATION FILED NOV. 13, 1906.

Witnesses:

Inventors:
Sigismund Rudolph James Maynard
Aldrovand Ceccelli Thomas Maynard
Frank Gale
by Chas. Ovendale
Attorney.

UNITED STATES PATENT OFFICE.

SIGISMUND RUDOLPH JAMES MAYNARD, ALDROVAND VECCELLI THOMAS MAYNARD, AND FRANK GALE, OF FORDSBURG, TRANSVAAL.

ROCK-DRILLING-MACHINE CHUCK.

No. 847,590.      Specification of Letters Patent.      Patented March 19, 1907.

Application filed November 13, 1906. Serial No. 343,299.

*To all whom it may concern:*

Be it known that we, SIGISMUND RUDOLPH JAMES MAYNARD, ALDROVAND VECCELLI THOMAS MAYNARD, and FRANK GALE, subjects of the King of Great Britain, and residents of Fordsburg, Transvaal, have invented certain new and useful Improvements in Rock-Drilling-Machine Chucks, of which the following is a specification.

This invention relates to rock-drilling-machine chucks, and is designed with the object of simplifying and improving such devices and rendering them more efficient in use.

In a chuck constructed in accordance with our invention the bit or steel may be removed and renewed with greater facility than at present, and the trouble experienced with existing chucks in inserting the steel, owing to the pad or gripping-piece falling too far into the bore of the chuck, is obviated. Further, the possibility of the steel tilting or inclining to the longitudinal axis of the bore of the chuck and the consequent excessive wear and tear on the parts, particularly when striking the rock-face at an angle, as in starting a hole, is avoided.

The improvements constituting our invention are illustrated in the accompanying sheet of drawings, wherein—

Figure 1:
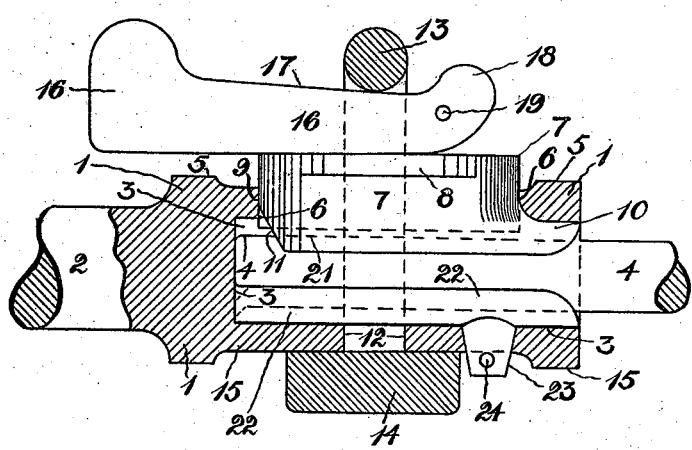
Figure 2:
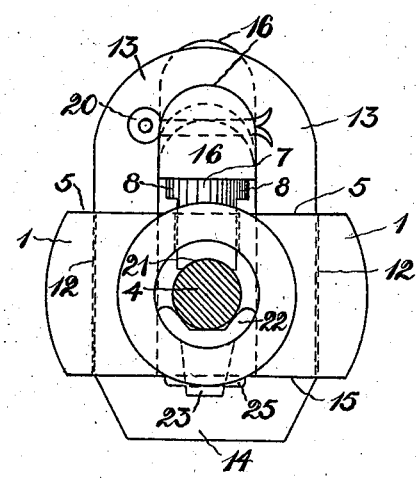

Figure 1 shows a chuck in part sectional longitudinal elevation, and Fig. 2 represents it in front or end elevation.

1 designates the body or head of the chuck, which, as shown, may be formed integral with the piston-rod 2 of the rock-drilling machine or, as preferred, be suitably attached to the forward end of said rod. The chuck is constructed with an axial hole 3, into which the shank or rear end of the drill or steel 4 is projected and in which it is secured. If desired, in the bottom of the axial hole 3 a cylindrical recess may be provided of approximately the same size as the end of the steel 4 to receive the end of the steel.

In one face 5 of the chuck is formed a longitudinal slot 6, which communicates with the bore 3. In this slot 6 is arranged a key 7 of the same width and length as the slot. The key 7 is constructed at the top with longitudinal lugs, ribs, or projections 8, which are adapted to engage the top face 5 of the chuck along the edges of the slot 6, so as to prevent the key falling into the bore 3 beyond a given distance. The rear end of the slot 6 preferably terminates, as indicated at 9, some distance in front of the bottom of the axial hole 3.

The key 7 is constructed at the forward end with a foot or projection 10, which when the key is in position projects forward, as shown more particularly in Fig. 1, into the bore, and so forms, with the key 7, a bushing for the forward end of the chuck. The provision of the forward projection 10 operates to prevent the tilting of the steel in the chuck and strengthens the chuck at this point. The projection 10 at the front is preferably rounded off, as shown in Fig. 1, in order to facilitate the insertion of the steel in the operation of renewing the same. The inner face of the key 7 at the rear end is preferably beveled off, as indicated at 11 in Fig. 1, in order to facilitate the insertion of the key 7 into the longitudinal slot 6.

Transversely of the head and passing through the bore 3 and longitudinal slot 6 is another slot 12, and in this slot is arranged a strap comprising the U-shaped piece 13, connected by the end piece or base 14. The U-shaped piece 13 of the strap passes round or down the sides of the key 7, and the base 14 engages the other face 15 of the chuck. The base 14 is made sufficiently broad to project for a suitable distance to either side of the transverse slot 12, (see Fig. 1,) so that the pull of the strap is exerted through the base 14 onto the face 15.

Between the U-shaped part 13 of the strap and the top of the key 7 is located the wedge 16, which is made with a parallel face engaging the top of the key 7 and an inclined edge 17 engaging the inside of the U-piece 13. The end 18 of the wedge 16 is turned upward at a suitable curvature, so that it may be withdrawn or inserted between the key 7 and U-piece 13.

19 is a hole formed in the end of the wedge 16 to receive a split pin 20 or its equivalent (see Fig. 2) to prevent the accidental displacement of the wedge. It will be apparent that by moving the wedge 16 in a forward direction the inclined upper edge 17 forces the strap upward until the base 14 engages the face 15 of the chuck. The wedge 16 then forces the key 7 into the slot 6 and causes the inner concave or curved longitudinal edge 21 to engage the end of the bit or steel 4, and so secure it in the chuck. By moving the wedge in the opposite direction it allows the strap to fall, and so releases the grip of the key 7 on the steel or bit 4 and allows it to be withdrawn.

In the bore of the chuck opposite the key 7 is arranged a half-bushing 22. This half-bush 22 is constructed at or toward its forward end with a projection 23, (shown of conical shape,) which is adapted to fit a corresponding conical hole formed in the chuck.

24 is a hole formed through the projection to receive a pin 25, (see Fig. 2,) which serves for retaining the half-bushing in position in the bore of the chuck. The half-bushing 22 fits between the U-shaped part 13 of the strap. The half-bushing 22, in similar manner to the projection 10 on the key 7, is curved or chamfered at the front end (see Fig. 1) in order to facilitate the insertion of the drill-steel 4.

What we claim as our invention, and desire to protect by Letters Patent, is—

1. In a rock-drill chuck, in combination, a head constructed with an axial bore, a longitudinal slot communicating with said bore and a transverse slot intersecting the axial bore and longitudinal slot, a strap in said transverse slot comprising the U-shaped piece 13 connected by the base portion 14, the latter exceeding the width of the slot 12 so that said part 14 engages the head along the edges of the slot 12, a key in the longitudinal slot, means for preventing said key falling into the bore of the chuck beyond a certain distance, a wedge between the strap and key for forcing the latter into the bore, and a half-bushing secured in the bore opposite said key.

2. In a rock-drill chuck, in combination, the head 1 constructed with the axial bore 3, longitudinal slot 9, transverse slot 12 and the hole opposite the forward end of the longitudinal slot, the strap in the transverse slot comprising the U-shaped piece 13 connected by the base portion 14, the width of the latter exceeding the width of the slot 12 so that it engages the head along the sides of said slot, the key 7 constructed with the longitudinal ribs 8 for preventing the key falling too far into the bore of the chuck and with the forwardly-inclined projection 10 rounded on the inside and forming a partial bushing for the front end of the axial bore, and beveled off at the rear end, the wedge 16 located between the strap and key and constructed with the hole 19, the pin 20 for preventing the wedge 16 disengaging the strap, the half-bushing 22 rounded on the inside at the forward end located in the bore opposite the key 7 and constructed with the projection 23 fitting the hole in the forward end of the axial bore, and the key 25 for retaining the projection 23 and half-bushing 22 in the bore, and the drill-steel 4 fitting the bore 3 between the key 7 and half-bushing 22, substantially as described and shown.

In witness whereof we have hereunto set our hands in the presence of two subscribing witnesses.

SIGISMUND RUDOLPH JAMES MAYNARD.
ALDROVAND VECCELLI THOMAS MAYNARD.
FRANK GALE.

Witnesses:
 CHAS. OVENDALE,
 R. OVENDALE.